a b c

United States Patent Office 3,277,367
Patented Oct. 4, 1966

3,277,367
D.C. MEASURING CIRCUIT INCLUDING ELECTRO-MAGNETIC MEANS FOR CONVERTING D.C. INPUT TO AMPLIFIED A.C. SIGNAL
Berthus Petersen, Delft, Netherlands, assignor to N.V. Instrument Fabriek en -Handel voorheen P. J. Kipp & Zonen, Delft, Netherlands, a Dutch limited-liability company
Filed May 18, 1962, Ser. No. 195,740
Claims priority, application Netherlands, May 29, 1961, 265,249
4 Claims. (Cl. 324—99)

The invention relates to a device for converting a D.C. current into an A.C. signal of larger power.

Such a device is of special advantage in a servo system of a recording D.C. measuring instrument and will be described with reference to such an application, although the range of applications is not restricted to that example.

In a known recording D.C. measuring instrument the D.C. current to be measured is supplied to the moving coil of a mirror galvanometer, which is located in a constant magnetic field. A light beam projected onto the mirror is reflected towards a control means including two light sensitive devices connected in a bridge circuit. The bridge circuit, which is energized with A.C. current, is balanced and consequently yelds no output voltage if the moving coil does not carry a current and consequently is in its zero position.

If a current to be recorded passes through the moving coil and the moving coil is deflected thereby, the reflected light beam is divided between the two light sensitive devices in a different ratio. This unbalances the bridge circuit and an A.C. voltage is generated which amplified if necessary, is supplied to a motor driving the recording means. A variable source of reference D.C. current is mechanically coupled with the recording means and supplies a counter-current to the moving coil. The counter-current is dependent upon the position of the recording means, so that the device comes to standstill in a position in which the counter-current exactly compensates the current to be recorded in the moving coil.

The bridge circuit, however, can become unbalanced due to other circumstances than a deviation of the light beam, such as aging of the components from which it is assembled. Especially the light sensitive devices are very sensitive for aging phenomena. Also it is virtually impossible to make the spectral sensitivities of the two light sensitive devices exactly equal to each other, whereby even a small variation of the spectral composition of the light can unbalance the bridge circuit.

Due to these phenomena undesirable zero point variations of the recording measuring instrument occur.

It is an object of the invention to provide a device for converting a D.C. current into an A.C. signal of larger power which is not subject to the above mentioned disadvantages.

A device according to the invention is characterized in that the magnetic field in which the moving coil is located has a constant amplitude and a periodically changing direction, while the control means can supply only A.C. voltages.

The invention is further explained below with reference to the drawing, which shows a known recording and measuring instrument and two recording and measuring instruments according to the invention.

Figure 1:
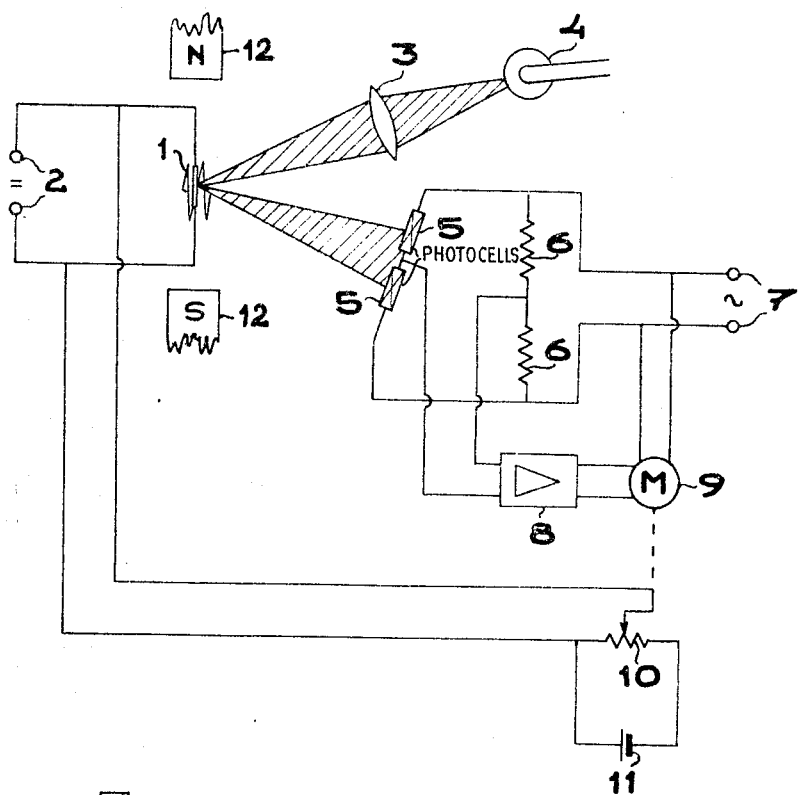
FIGURE 1 is a circuit diagram of a previously known recording and measuring instrument as described above.

In FIGURE 1 the moving coil of a mirror galvanometer is indicated at 1, the D.C. current to be recorded being supplied to the moving coil through the terminals 2. The moving coil 1 is suspended in the field of a magnet 12. By means of a lens 3 the light of a lamp 4 is concentrated on the mirror. The reflected beam is, in the rest position of the moving coil 1, equally divided between two photo-resistors 5 or other photo-electrical converters, which together with two resistors 6 form a bridge circuit, which is energized with A.C. voltage through the terminals 7. If the photo-resistors are illuminated equally the bridge is balanced and no input signal is supplied to the amplifier 8.

If a D.C. current is supplied to the input terminals 2 the moving coil 1 is deflected, whereby the reflected light beam is divided unequally between the photo-resistors 5 and the bridge becomes unbalanced. Thereby the bridge yields an A.C. output voltage which, through the amplifier 8, is supplied to a motor 9 arranged to drive the recording means. A reference potentiometer 10, coupled to the recording means and the motor 9, is energized by a reference current source 11 to provide a counter-current through the moving coil 1 which is dependent upon the position of the recording means. Consequently the recording means comes to a standstill in a position in which the counter-current which is provided by the potentiometer 10 exactly compensates the input current at the terminals 2.

A disadvantage of the above device is that the bridge can also become unbalanced through other causes than an input current at the terminals 2, whereby the zero point is affected.

Figure 2:
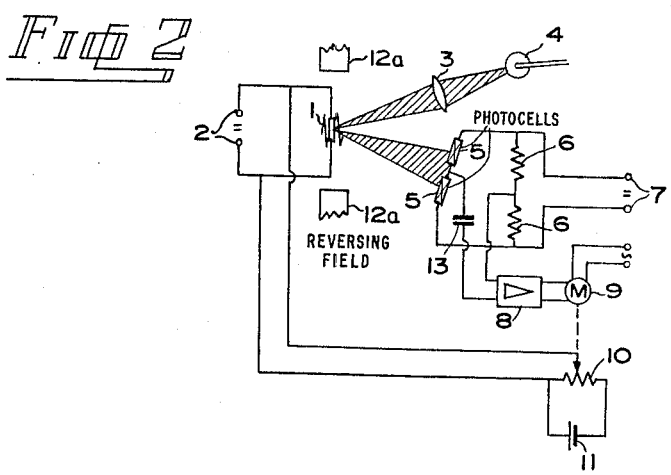
FIGURE 2 is a circuit diagram of a recording and measuring instrument according to the invention.

This disadvantage is obviated by a device according to the invention, of which FIGURE 2 illustrates an example.

In FIGURE 2 similar components as in FIGURE 1 are indicated with the same reference numerals.

In the recording instrument of FIGURE 2 the bridge 5, 6 is through the terminals 7 energized with D.C. voltage instead of A.C. voltage. The bridge 5, 6 can consequently generate an A.C. voltage only if the reflected light beam cyclically moves across the photo-resistors, regardless of the question whether on the average the bridge is balanced or not. If the bridge is on the average unbalanced it also generates a D.C. output voltage, which can be suppressed, if desired, by incorporating a capacitor 13 in one of the output leads. The D.C. current to be recorded, which is supplied to the input terminals 2, is converted into an oscillation of the reflected light beam by employing a magnet 12a which generates a magnetic field of constant amplitude but periodically reversing direction. This can be accomplished for example by periodic reversal of the excitation of an electromagnet.

Consequently the moving coil 1 executes an oscillating movement in the periodic magnetic field of the magnet 12a if a D.C. current flows through it. It comes to standstill only if this D.C. current is exactly compensated by the current originating from the reference potentiometer 10. As soon as that is attained the bridge 5, 6 no longer supplies an A.C. voltage to the amplifier 8, so that the motor 9 and consequently the recording means and the reference potentiometer 10 come to standstill.

In the ideal case the moving coil in its rest position is parallel to the magnetic field of the magnet 12a, which, however, in practice cannot always be attained, inter alia due to aging of the suspension means of the moving coil. If the moving coil 1 makes an angle with the magnetic field a voltage is induced in it during each reversal of the magnetic field. This induced voltage causes an A.C. current in the moving coil which, even in the absence of a D.C. current through the moving coil, could cause an oscillation.

However, in the moving coil a voltage is induced and resulting current flows only during the short intervals during which the magnetic field is reversing in direction. The torque exerted on the moving coil, equal to the product of the induced current and the field strength, acts first in one direction and then reverses so that the net torque is practically zero during each reversal of the magnetic flux.

Figure 3:
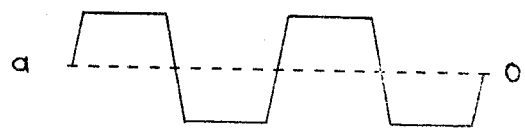
FIGURE 3 is a diagram for explaining various aspects of the operation of the device according to FIGURE 2.
Figure 3:
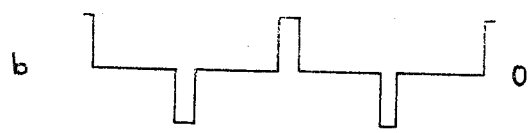
Figure 3:
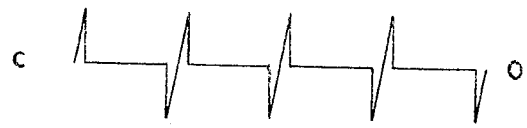

This is explained with reference to FIGURE 3.

The waveform of the magnetic field, the strength and duration of the field as a function of time, is indicated at $a$, in which for simplicity a trapezium-shaped wave is assumed. The flux reversals can have a relatively shorter portion of the cycle time than would follow from the diagram.

The voltage induced as the magnetic field reverses in the moving coil 1, if this makes an angle with the direction of the magnetic field, is indicated at $b$ and consists of a succession of narrow pulses of alternating polarity, which cause corresponding current pulses in the moving coil.

The torque exerted on the moving coil by these current pulses and the magnetic field is the product of the curves $a$ and $b$ and is shown at $c$. From this figure it appears that the resulting torque consists of short symmetrical impulses around the value zero, which impulses occur with relatively large intervals. Because of its mechanical inertia the moving coil does not respond to these torque impulses.

Figure 4:
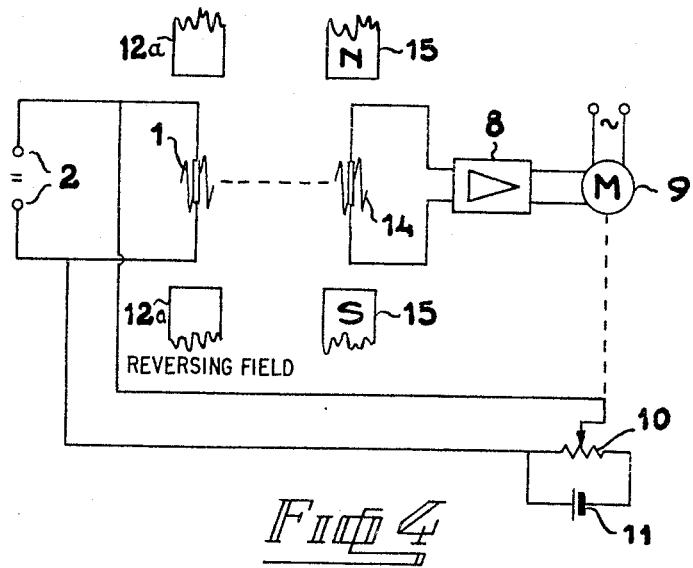
FIGURE 4 is a circuit diagram of another embodiment of a recording and measuring instrument according to the invention.

A different recording measuring instrument according to the invention is shown diagrammatically in FIGURE 4. Therein the optical system and the bridge circuit of the FIGURES 1 and 2 have been replaced by a second moving coil 14, which is mechanically coupled to the first moving coil 1 and which is suspended in a constant magnetic field of a second magnet 15. The oscillations of the first moving coil 1 are transferred to the second moving coil 14, in which consequently an A.C. voltage is generated. Only if the first moving coil is at standstill, i.e. if the D.C. current to be recorded is exactly compensated by the D.C. reference current, the second moving coil 14 also is at standstill, so that therein no A.C. voltage is induced.

Such a device has the advantage of a very simple construction and of being operative even if the moving coils in their rest position make a rather large angle with the magnetic field, which could occur due to aging phenomena of the moving coil suspension. In a device according to the FIGURES 1 and 2 in the event of a large deflection of the moving coil the reflected light beam could be situated completely off the photo-resistors, whereby the entire device would be inoperative.

The device according to the invention has hereinabove been described with reference to its application to servo systems for recording and measuring instruments. Although this indeed constitutes an important application, a device according to the invention can generally be employed in all cases in which a D.C. current should be converted into an A.C. signal.

I claim:

1. In a direct current measuring circuit which is free from zero shift, a device for converting a direct current into an A.C. signal of larger power comprising, in combination, a coil which is movably mounted and which carries the direct current, an A.C. signal generator which is actuated by mechanical oscillation of the coil to generate an A.C. signal whose amplitude is proportional to the amplitude of such oscillation, and means for producing a magnetic field intersecting the coil of constant amplitude and periodically reversing polarity, at a constant frequency low enough to cause the coil to oscillate with an amplitude proportional to the direct current in the coil and to cause the signal generator to generate an A.C. signal of constant frequency whose amplitude is proportional to the direct current in the coil.

2. In a direct current measuring circuit, a device according to claim 1 wherein the A.C. signal generator comprises means for producing a constant magnetic field, and a pickup coil which is movably mounted in such magnetic field and is mechanically coupled to the coil which carries the direct current, to generate in the pickup coil an A.C. signal whose amplitude is proportional to the direct current.

3. In a direct current measuring circuit, a device according to claim 1 wherein the A.C. signal generator comprises a light source, a mirror carried by the coil and exposed to the light source, and a photo-sensitive element for receiving light reflected by the mirror.

4. In a direct current measuring circuit, a device according to claim 1 which comprises a rebalancing servomotor having a power supply, the A.C. signal generator being connected to activate such power supply in order to energize the servomotor, a direct current power supply controlled by the servomotor, and means for connecting the output of the direct current power supply to buck out the direct current to be measured and to provide a recorded measurement thereof.

References Cited by the Examiner

UNITED STATES PATENTS

| 1,904,607 | 4/1933 | Bethenod | 329—199 X |
| 2,112,560 | 3/1938 | Davies | 310—113 X |
| 2,368,701 | 2/1945 | Borden | 330—58 X |
| 2,559,245 | 7/1951 | Fay | 324—99 |
| 2,870,350 | 1/1959 | Olson | 322—3 X |

WALTER L. CARLSON, *Primary Examiner.*

FREDERICK M. STRADER, *Examiner.*

D. R. GREENE, R. V. ROLINEC,
*Assistant Examiners.*